(No Model.)
D. H. DICKINSON.
APPARATUS FOR PRESERVING BY VACUUM AND PRESSURE.
No. 328,016. Patented Oct. 13, 1885.
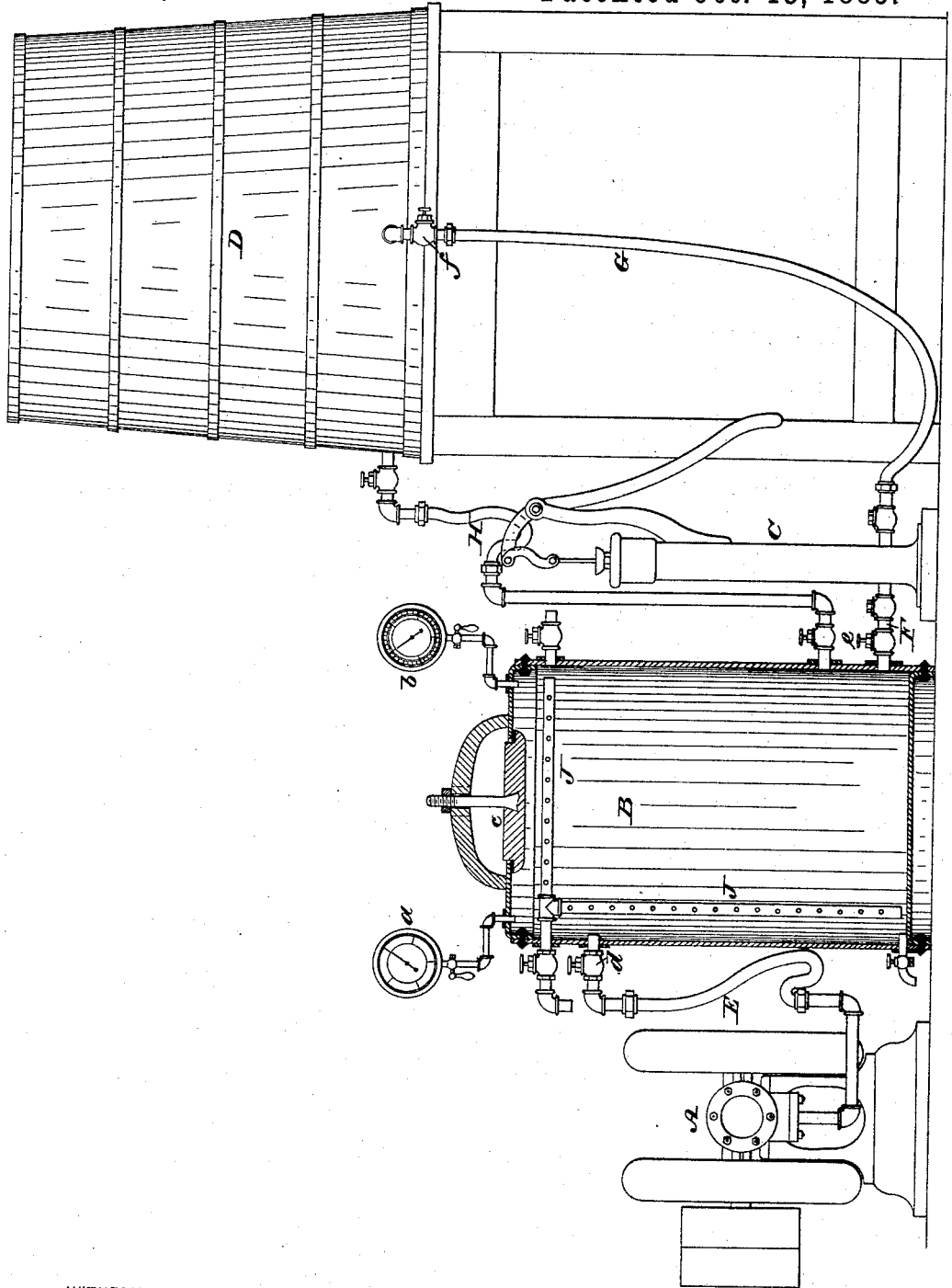

UNITED STATES PATENT OFFICE.

DUDLEY H. DICKINSON, OF PHILADELPHIA, PENNSYLVANIA.

APPARATUS FOR PRESERVING BY VACUUM AND PRESSURE.

SPECIFICATION forming part of Letters Patent No. 328,016, dated October 13, 1885.

Application filed November 1, 1884. Serial No. 146,975. (No model.)

*To all whom it may concern:*

Be it known that I, DUDLEY H. DICKINSON, a citizen of the United States, residing in the city and county of Philadelphia, State of Pennsylvania, have invented a new and useful Improvement in Apparatus for the Preservation of Animal, Vegetable, and other Substances, which improvement is fully set forth in the following specification and accompanying drawing, in which the figure is a partial side elevation and partial vertical section of an apparatus for the preservation of animal and other substances embodying my invention.

Referring to the drawing, A represents a vacuum-pump; B, a preserving cylinder or receptacle; C, a force or pressure pump, and D a tank for a preservative compound or material, all of which are formed of suitable material and properly mounted.

E represents a pipe connected with the vacuum-pump A and receptacle B.

F represents a pipe connected with the force-pump C and receptacle B.

G represents a pipe connected with the tank D and pump C, and H represents a pipe connected with the tank D and receptacle B.

A vacuum-gage, *a*, and pressure-gage *b* are connected with the receptacle B, and the latter is also provided with a hand-hole and a covering or door, *c*, for access to the interior of the same, said covering or door being properly packed to form an air-tight joint therefor, the receptacle when in use being air-tight in all respects.

The operation is as follows: The article or substance to be preserved is placed in the receptable B and the vacuum-pump A operated to exhaust all air, vapor, &c., from the substance and open the pores thereof, so that all vapor, &c., is extracted therefrom. When this is accomplished, the cock *d* of the pipe E is closed, the cocks *e f* of the pipes F and G are opened, and the pump C is operated, the effect of which is to force the preservative compound or material from the tank D into the receptacle B, and consequently into the substance in the latter, so as to thoroughly permeate said substance and cause the reliable preservation of the same.

For some requirements a quantity of preservative compound or material may be primarily introduced into the receptacle B, in which case I use the pipe H, and thereby saturate the substance during the creation of a vacuum in the receptacle or prior thereto, said pipe H having suitable stop-cocks for evident purposes.

For the preservation of ham and other meats, I may place curing materials in the receptacle B, then create the vacuum, and afterward the pressure, and the material from the tank D may also be directed into the receptacle in order to treat the meat therewith, it being seen that in all cases the combined action of vacuum and hydraulic pressure of a preservative fluid or material on the substances in the tank acts upon said substances in such manner that when removed from the receptacle they will be found to be reliably preserved.

The vacuum created in the receptacle should be as perfect as possible, and in order to accomplish the same I employ a perforated elbow-pipe, J, and locate the same within the receptacle B and connect it with the exhaust or vacuum pump A.

One limb of the pipe J reaches to the bottom of the receptacle and the other extends across the top thereof, so that every particle of air, gas, vapor, &c., in said receptacle may be removed, said limbs being perforated throughout or open at their ends, or both, as desired.

The pumps may be operated by hand or power, and may be of any suitable form.

By my apparatus I am enabled to impart preservative qualities to all manner of food, green hides, skins, leather, wood, human bodies, and all other perishable substances.

I am aware that the use of a vacuum-pump in connection with a preserving-cylinder and a force-pump for the preservation of perishable substances is not new, wherefore I do not broadly claim the same.

Having thus described my invention, what I claim as new, and desire to secure by Letters Patent, is—

An apparatus for causing the preservation of perishable substances, consisting of a vacuum-pump A, preserving-cylinder B, having the perforated elbow J and having vacuum and pressure gages, pipe E, connecting said vacuum-pump A and cylinder B, force or pressure pump C, tank D, pipe F, connecting said cylinder B and force-pump C, pipe G, connecting said force-pump C and tank D, and pipe H, connecting said cylinder B and tank D, all of said parts being arranged and combined substantially as and for the purpose set forth.

D. H. DICKINSON.

Witnesses:
 JOHN A. WIEDERSHEIM,
 JOHN DOUGHERTY.